US 8,250,121 B2

(12) United States Patent
Daynes et al.

(10) Patent No.: US 8,250,121 B2
(45) Date of Patent: Aug. 21, 2012

(54) ZERO-COPY MATURING OF LARGE OBJECTS IN GENERATIONAL HEAP WITH COPYING COLLECTION

(75) Inventors: Laurent Phillipe Daynes, Saint-Ismier (FR); Thomas Schatzl, Linz (AT)

(73) Assignee: Oracle America, Inc., Redwood City, CA (US)

( * ) Notice: Subject to any disclaimer, the term of this patent is extended or adjusted under 35 U.S.C. 154(b) by 345 days.

(21) Appl. No.: 12/621,458

(22) Filed: Nov. 18, 2009

(65) Prior Publication Data

US 2011/0119318 A1    May 19, 2011

(51) Int. Cl.
*G06F 17/30* (2006.01)
(52) U.S. Cl. ............................................ 707/816
(58) Field of Classification Search .................. 707/2, 3, 707/816; 717/151
See application file for complete search history.

(56) References Cited

U.S. PATENT DOCUMENTS 7,287,049 B1 * 10/2007 Printezis et al. ...................... 1/1
2006/0059474 A1 * 3/2006 Bhansali et al. ............... 717/151
* cited by examiner

*Primary Examiner* — Etienne Leroux
(74) *Attorney, Agent, or Firm* — Osha Liang LLP

(57) ABSTRACT

A method for performing garbage collection promotion, comprising determining that an age of a large young object is greater than a predetermined tenuring threshold, wherein the predetermined tenuring threshold specifies an age beyond which objects are promoted, setting a plurality of types of a plurality of large memory regions from young to old to promote the large young object to a large old object, wherein the plurality of large memory regions host the large young object, scavenging references of the large old object, wherein the large old object is a large promoted object, scanning a large young object list to identify a plurality of unvisited large young objects, wherein a plurality of visited bits of the plurality of unvisited large young objects are unset, and releasing a plurality of unvisited large memory regions, wherein the unvisited large memory regions host the plurality of unvisited large young objects.

9 Claims, 8 Drawing Sheets

System 100

ZERO-COPY MATURING OF LARGE OBJECTS IN GENERATIONAL HEAP WITH COPYING COLLECTION

BACKGROUND

Garbage collection is a mechanism used for memory management in computer systems. Garbage collectors function by reclaiming memory used by objects that are no longer in use by an application or computer system (i.e. garbage). A generational garbage collector relies on the observation that objects often die young (i.e. become garbage shortly after their allocation). Young objects are typically segregated from older objects (i.e. objects that have been alive or in use for a certain number of garbage collections), as this enables the garbage collector to reclaim space from a younger generation (i.e. a set of young objects) at low cost (e.g. collection cost is typically proportional to the number of live objects). A common and effective strategy is to divide heap space in at least two generations—a young generation and an old generation. Objects are allocated in the young generation and mature there until they reach a specific age that makes them candidates for promotion to the old generation. A commonly used aging mechanism consists of counting how many young generation garbage collections an object survives (e.g. by increasing a counter in the object's header). In order to perform a garbage collection of the young generation only, references from the old generation to the young generation need to be tracked. The data structure used to keep track of these cross-generation references is called a remembered set.

Region-based garbage collectors go a step further and decompose the heap into relatively small logical regions of fixed size that can be collected independently so as to limit pause-time and improve responsiveness of applications. Region-based garbage collectors are also better equipped to adjust the effective footprint of applications as they enable the release of backing storage (i.e. main-memory) used by the virtual pages of arbitrary unused regions. Region-based garbage collectors can be combined with generational mechanisms as segregating young from old objects provides an easy way to identify regions with large amounts of garbage. In this case, each generation is made of a set of (potentially non-contiguous) regions. Each region carries a type that indicates what generation the region belong to (e.g. the eden and survivor type of regions belong to the young generation, while old regions belong to the old generation). Region-based garbage collectors are equipped with the necessary remembered set mechanisms to enable collection of one or more regions independently of others. This remembered set can be used as well to trace all live young objects.

The young generation is often collected using a copying mechanism, wherein live objects are evacuated from the young generation to a small maturing space that is part of the young generation. For instance, the young generation may be organized as one large eden space and two small survivor spaces (respectively, the from and to spaces), only one of which is active at a time. Mutator threads may allocate objects directly into the eden space via thread local allocation buffers. A young generation collection evacuates the live objects by copying the live objects from the eden space and the from survivor space to the to survivor space. The evacuated regions are then returned to a pool of free regions. The age of an object is increased as the object is copied to the to survivor space. Objects with an age greater than a tenuring threshold are promoted (i.e. copied) to the old generation. The greater the size of an object, the more memory and resource intensive the promotion (i.e. copying) of the object is.

SUMMARY

In general, in one aspect, the invention relates to a method for performing garbage collection promotion, including determining that an age of a large young object is greater than a predetermined tenuring threshold, wherein the predetermined tenuring threshold specifies an age beyond which objects are promoted, setting a plurality of types of a plurality of large memory regions from young to old to promote the large young object to a large old object, wherein the plurality of large memory regions host the large young object, scavenging references of the large old object, wherein the large old object is a large promoted object, scanning a large young object list to identify a plurality of unvisited large young objects, wherein a plurality of visited bits of the plurality of unvisited large young objects are unset, and releasing a plurality of unvisited large memory regions, wherein the unvisited large memory regions host the plurality of unvisited large young objects.

In general, in one aspect, the invention relates to a system for performing garbage collection promotion, including a processor, a memory operatively connected to the processor, and a garbage collector memory heap including a young generation, an old generation, and a plurality of large memory regions configured to determine that an age of a large young object is greater than a predetermined tenuring threshold, wherein the predetermined tenuring threshold specifies an age beyond which objects are promoted, set a plurality of types of the plurality of large memory regions from young to old to promote the large young object to a large old object, wherein the plurality of large memory regions host the large young object, scavenge references of the large old object, wherein the large old object is a large promoted object, scan a large young object list to identify a plurality of unvisited large young objects, wherein a plurality of visited bits of the plurality of unvisited large young objects are unset, and release a plurality of unvisited large memory regions, wherein the unvisited large memory regions host the plurality of unvisited large young objects.

In general, in one aspect, the invention relates to a computer readable medium storing instruction to perform garbage collection promotion, the instructions executable on a processor and including functionality to determine that an age of a large young object is greater than a predetermined tenuring threshold, wherein the predetermined tenuring threshold specifies an age beyond which objects are promoted, set a plurality of types of a plurality of large memory regions from young to old to promote the large young object to a large old object, wherein the plurality of large memory regions host the large young object, scavenge references of the large old object, wherein the large old object is a large promoted object, scan a large young object list to identify a plurality of unvisited large young objects, wherein a plurality of visited bits of the plurality of unvisited large young objects are unset, and release a plurality of unvisited large memory regions, wherein the unvisited large memory regions host the plurality of unvisited large young objects.

Other aspects and advantages of the invention will be apparent from the following description and the appended claims.

DETAILED DESCRIPTION

Figure 1:
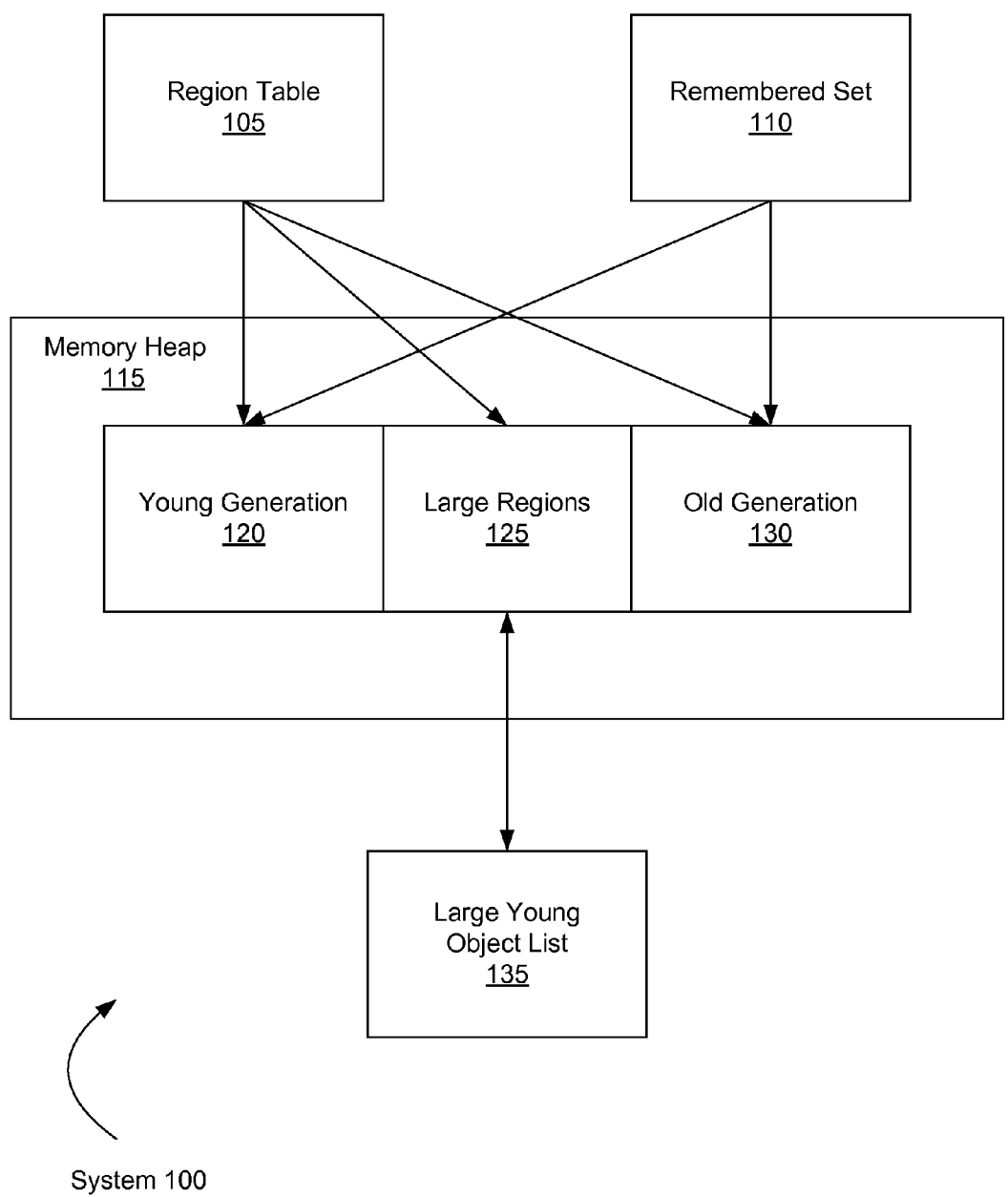
FIGS. 1-3 show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for performing promotion of large objects without requiring copying. In general, embodiments of the invention provide a system and method for promoting large objects through the use of large memory regions in the memory heap. In general, embodiments of the invention provide a system and method for keeping track of large objects.

FIG. 1 shows a system (100) in accordance with one or more embodiments of the invention. As shown in FIG. 1, the system (100) has multiple components including a region table (105), a remembered set (110), a memory heap (115), which includes a young generation (120), large regions (125), and an old generation (130), and a large young object list (135). These components are described below and may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one memory heap (and therefore young generation, large regions, and old generation) running on a device, as well as more than one region table, remembered set, and large young object list interfacing with those components.

In one or more embodiments of the invention, a region table (105) is a data structure that keeps track of the type of the regions of the heap. The region type indicates the age and size of the objects (i.e. young or old, large or small) hosted by the region, which in turn indicates what generation these objects belong to (i.e. the young generation or the old generation). Other information such as the precise list of all the young large objects may be obtained via the young large object list (135).

In one or more embodiments of the invention, a remembered set (110) is a data structure that may be used to keep track of cross-generation references. In order to perform a garbage collection of a young generation, references from the old generation to the young generation are tracked in the remembered set (110). A reference from the old generation to the young generation may be represented in numerous forms, such as a pointer from an object in the old generation (130) space of the memory heap (115) to an object in the young generation (120) space of the memory heap (115). Those skilled in the art will appreciate that there may be various other representations used in the remembered set (110).

In one or more embodiments of the invention, a memory heap (115) may be a set of contiguous or non-contiguous memory blocks that include a young generation (120) memory space, an old generation (130) memory space, and a large regions (125) memory space. Those skilled in the art will appreciate that the present invention is intended to be used in memory (e.g. short term memory, flash, RAM, ROM, and the like), as opposed to storage (e.g. long term storage).

In one or more embodiments of the invention, a young generation (120) may be a part of the memory heap (115) that includes regions containing an eden space, a from survivor space, and a to survivor space. Objects are allocated in the eden space, and when the eden space is full, objects are allocated in the from survivor space. When an object is allocated to one of these two spaces, the size of the object whose allocation is requested is obtained in order to select an allocation method suited for the request. Those skilled in the art will appreciate that there are various ways of performing this procedure. When both the eden space and the from survivor space are full, a minor garbage collection may be performed. The minor garbage collection evacuates all the objects reachable from root objects into the to survivor space, or if the age of the object is greater than a tenuring threshold (i.e. an age beyond which the object is to be promoted from the young generation to the old generation), the minor garbage collection evacuates all the objects into the old generation (130). If the to survivor space is full, objects in the eden space or the from survivor space are typically evacuated regardless of their age into the old generation (130). At the end of the garbage collection, the to survivor space is transposed with the from survivor space, and applications then may resume allocating in the now empty eden space and from survivor space. Those skilled in the art will appreciate that there may be various mechanisms by which to perform garbage collection in the young generation (120).

In one or more embodiments of the invention, an old generation (130) may be a part of the memory heap (115) that contains a small old region. After objects allocated in the young generation (120) reach a specific age, they may become candidates for promotion to the old generation (130). Promotion of an object refers to the object becoming an old object from a young object. A simple mechanism to keep track of the age of an object is to keep track of the number of young generation garbage collections the object has survived (e.g. by increasing an age counter in the object's header).

In one or more embodiments of the invention, large objects are treated differently than objects of smaller sizes, as they may not fit in the young generation (120) due to size constraints. In a region-based garbage collector, a large object designates any object with a size larger than that of a single region, or larger than a substantial fraction of a single region (e.g. 90% of a single region). A large object is typically allocated as a set of contiguous regions. Classic generational collectors (i.e. those not based on regions) allocate large objects directly in the old generation, as it is typically much larger than the young generation and can easily fit large objects. This however causes pre-tenuring of large objects which increases space pressure on the old generation, which in turn may provoke premature full garbage collection. In the case of large reference arrays, pre-tenuring may also result in substantial inflation of remembered sets. For applications with large heap requirement (e.g. server side applications), these effects may be anecdotal as their young generation may be large enough to welcome most large objects. However, for applications with small heap requirement (e.g. applications on small devices such as mobile devices), a larger population of objects may qualify as large objects and may be assigned to the old generation, further exacerbating the above issues. This is more true in region-based garbage collection, where the region size is relatively small and any object larger than a region (itself smaller than the young generation) may qualify as a large object.

On the other hand, leaving large objects in the young generation has other undesirable effects, especially if a large object ends up being long-lived. In this case, keeping large objects in the young generation increases pressure in the young generation, thus increasing the frequency of young generation garbage collections, which in turn artificially accelerates the tenuring of young objects. Further, when the young generation is collected using a copying technique (as is often the case), leaving large objects in the young generation causes excessive copying (especially when these large objects are long-lived).

In one embodiment of the present invention, a generational garbage collector based on large region collection enables tenuring of large objects at no-copying cost while avoiding the aforementioned issues.

In one or more embodiments of the invention, large regions (125) are new types of regions introduced to host large objects (e.g. large young regions and large old regions). The large regions (125) may be composed of a set of large regions. When allocating a large object, a set of contiguous regions in the large regions (125) may be allocated from a pool of free large regions to host (i.e. contain) the large object. The large regions are initially tagged with the large "young" region type (e.g. in the region table (105)), and the new large object is added to a list of large young objects (e.g. the large young object list (135)). Those skilled in the art will appreciate that both the young generation (120) and the old generation (130) may also be composed of various regions.

In one or more embodiments of the invention, a large young object list (135) may be used to identify large young objects, their location in the memory heap (115), and other data pertinent to large young objects. The large young object list (135) may be implemented as any data structure (e.g. a linked list, a hash table, a tree, a vector, and so forth) that allows it to keep track of information associated with large young objects. At the end of a garbage collection, the large young object list (135) may be used to perform operations on large young objects (e.g. at the end of a minor garbage collection). For example, the large young object list (135) may be used to identify large young objects and free the memory regions of large young objects that don't have their visited bit set. Further, the large young object list (135) may be used to identify large young objects in order to remove them from the large young object list (135) (e.g. when objects are effectively dead and their space is reclaimed, or if objects have tenured and become large old objects). The large young object list (135) may also be used to identify large young objects in order to clear their visited bits. Those skilled in the art will appreciate that the large young object list (135) may be used to perform numerous other tasks not described, and may be implemented in various technologies and data structures.

Figure 2:
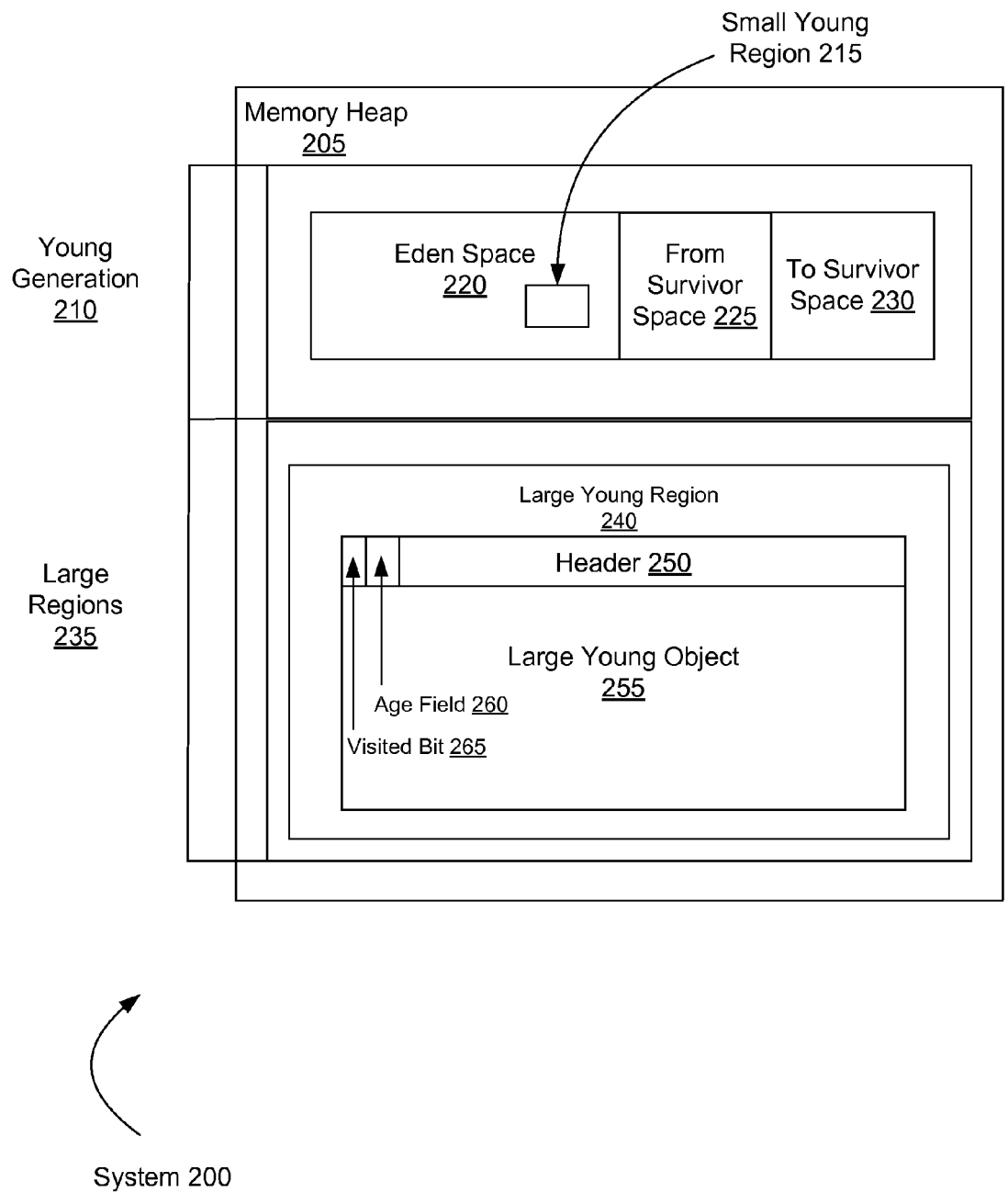

FIG. 2 shows a system (200) in accordance with one or more embodiments of the invention. The system shown in FIG. 2 may be used, for example, to maintain young large objects. Those skilled in the art will appreciate that the elements shown in FIG. 2 may differ among embodiments of the invention, and that one or more of the elements may be optional.

FIG. 2 shows a system (200) containing a memory heap (205), which in turn contains a young generation (210) and large regions (235). The young generation (210) contains a small young region (215). Those skilled in the art will appreciate that there may be many such small young regions in the young generation (210). The young generation (210) also contains an eden space (220), a from survivor space (225), and a to survivor space (230). Each of these spaces may comprise one or more small young regions (e.g. small young region (215)). Those skilled in the art will appreciate that although the small young region (215) is depicted as being located in the eden space (220), it could also be located in the from survivor space (225) or the to survivor space (230). Please refer to the previous description of these spaces for details on these spaces. The large regions (235) may contain a large young region (240). Those skilled in the art will appreciate that there may be many such large young regions in the large regions (235). The large young region (240) may host a large young object (255). The type of the large young region (240) is stored in the region table (105), as described above. Those skilled in the art will appreciate that the large young object may be hosted across multiple contiguous large young regions. The large young object (255) may contain a header (250), which itself includes a visited bit (265), and an age field (260). The header (250) may coincide with the beginning of the first byte of the first of the contiguous large regions (235). Those skilled in the art will appreciate that there may be various other bits and fields in the header (250) of the large young object (255). The visited bit (265) keeps track of whether the object has been visited in the current garbage collection cycle. The age field (260) keeps track of how many garbage collection cycles the large young object (255) has survived. Please refer to the description above regarding the behavior of the large young object (255). Those skilled in the art will appreciate that the functionality of the visited bit may be implemented in an external mark bitmap of the garbage collector, as well as through numerous other mechanisms.

Figure 3:
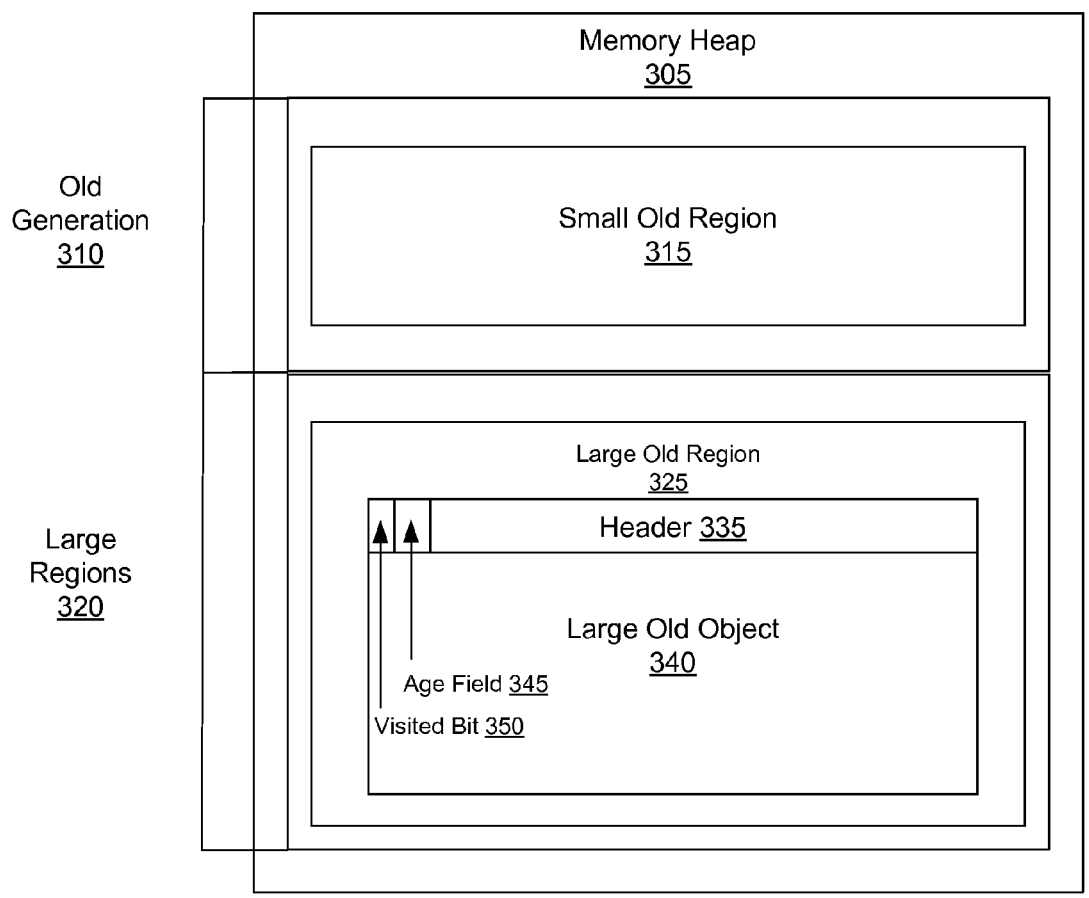
Figure 3:

FIG. 3 shows a system (300) in accordance with one or more embodiments of the invention. The system shown in FIG. 3 may be used, for example, to maintain large old objects. Those skilled in the art will appreciate that the elements shown in FIG. 3 may differ among embodiments of the invention, and that one or more of the elements may be optional.

FIG. 3 shows a system (300) containing a memory heap (305), which in turn contains an old generation (310) and large regions (320). The old generation (310) contains a small old region (315). Those skilled in the art will appreciate that there may be many such small old regions in the old generation (310). The large regions (320) may contain a large old region (325). Those skilled in the art will appreciate that there may be many such large old regions in the large regions (320). The large old region (325) may be associated with a type set to large old in the region table (105), and may host a large old object (340). Those skilled in the art will appreciate that the large old object (340) may be hosted across multiple contiguous large old regions. The large old object (340) may contain a header (335), which itself includes a visited bit (350), and an age field (345). Those skilled in the art will appreciate that there may be various other bits and fields in the header (335) of the large old object (340). The visited bit (350) keeps track of whether the large old object (340) has been visited in the current garbage collection cycle. The age field (345) keeps track of how many garbage collection cycles the large old object (340) has survived. Please refer to the description above regarding the behavior of the large old object (340).

Figure 4A:
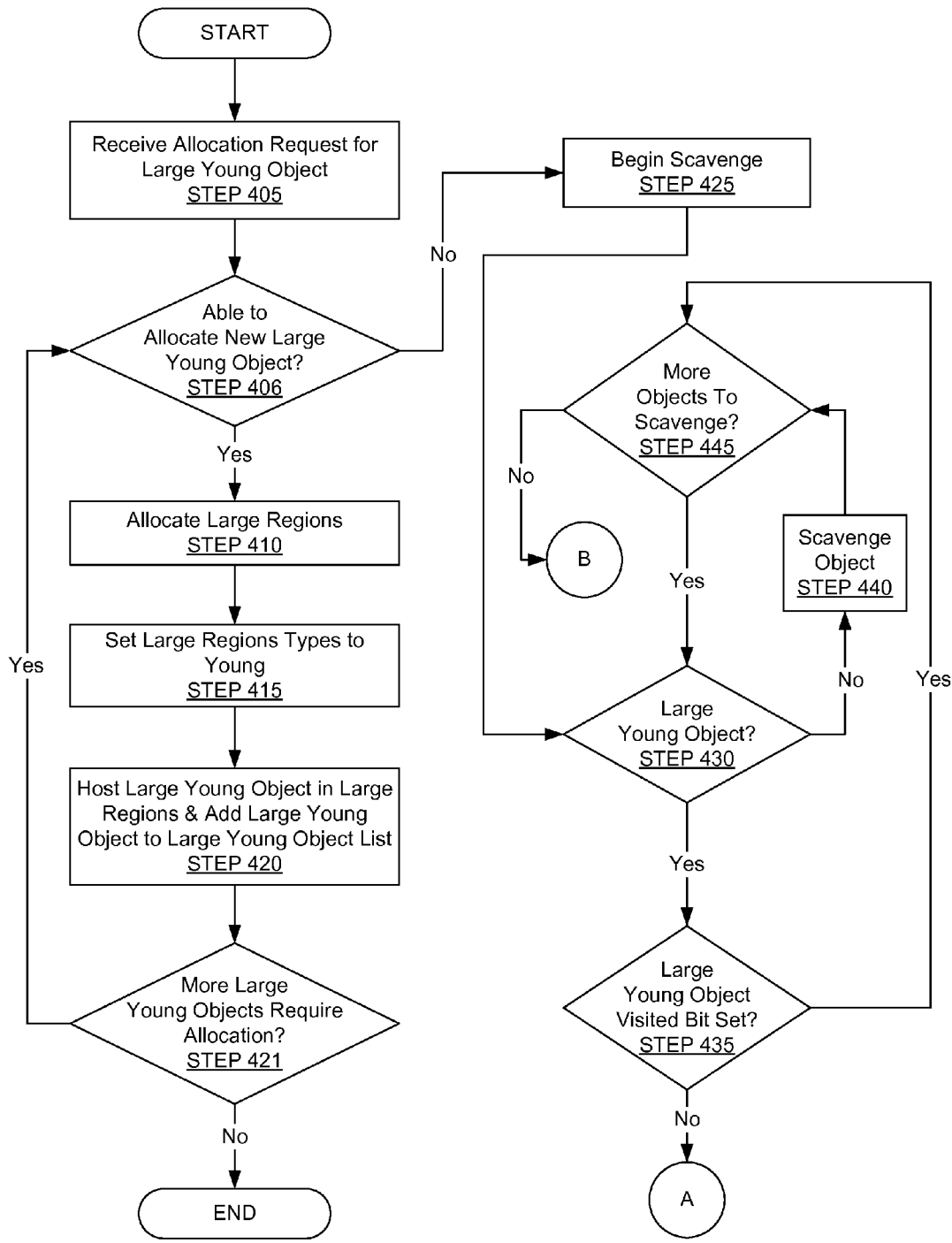
FIGS. 4A and 4B show flowcharts in accordance with one or more embodiments of the invention.
Figure 4B:
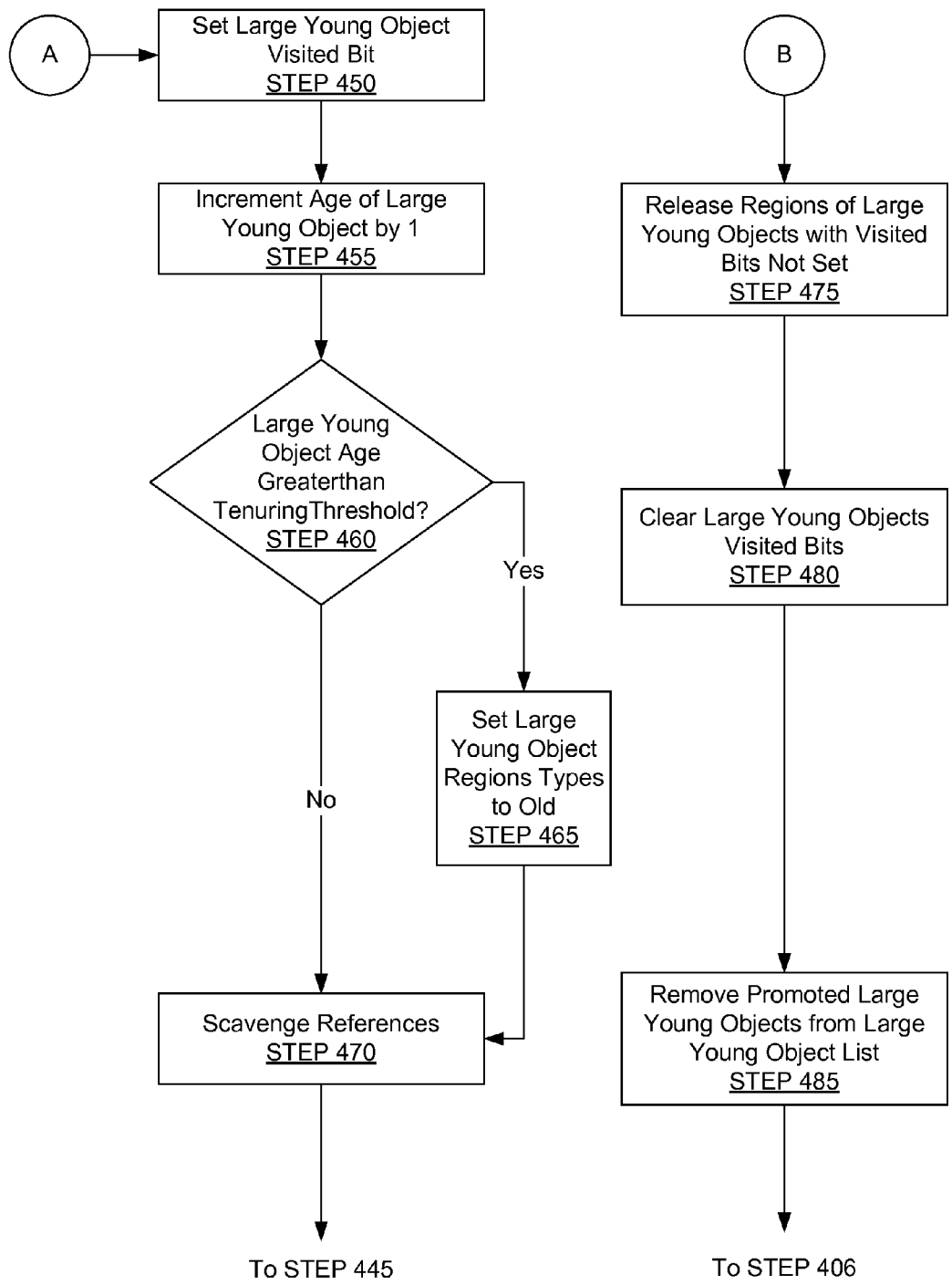

FIGS. 4A and 4B show a flowchart in accordance with one or more embodiments of the invention. The process shown in FIGS. 4A and 4B may be used, for example, with the system (100), to promote large young objects to large old objects without copying. Those skilled in the art will appreciate that the sequence of steps shown in FIGS. 4A and 4B may differ among embodiments of the invention, and that one or more of the steps may be optional.

In STEP 405, an allocation request for a large object is received. For example, a running application may request an object allocation, after which an object allocator may decide how the object should be allocated (e.g. based on the object's size, in the case of a large object it will request an allocation for a large object).

Those skilled in the art will appreciate that if instead of a large object, a small object requires allocation, the garbage collector may allocate space for a new small object. If for some reason allocation of a small object is not possible (e.g. the young generation is full, or a threshold for reclaiming memory has been reached), the process may proceed to perform garbage collection (e.g. STEP 425). After garbage collection has been performed, the process determines once more if it can proceed with allocation of the small object. If it does, the process then proceeds to allocate the small object.

In STEP 406, the process determines whether it can allocate the new large young object. If allocation of the large object is not possible (e.g. there are not enough large regions for the large young object, or a threshold for reclaiming memory has been reached), the process proceeds to STEP 425 to perform garbage collection. At some point after garbage collection has been executed (e.g. STEP 485), the process may return to STEP 406 to determine once more if it can proceeds with allocation of the new large young object. If it is able to allocate the new large young object, the process then proceeds to STEP 410.

In STEP 410, large regions are allocated. The large regions (e.g. large regions (125)) may be allocated in the memory heap (e.g. memory heap (115)). Those skilled in the art will appreciate that the new large young object may require a single large region or multiple large regions to host it in the memory heap. The large regions may be contiguous or non-contiguous in the large regions area.

In STEP 415, the types of the large regions are set to young (e.g. in the region table (105)). The types may be set by the garbage collector. Setting the types of the large regions to young indicates that these large regions are now large young regions. Those skilled in the art will appreciate that the garbage collector may reserve a predetermined number of large regions for the young generation, with their region types pre-set to the large young region. In this case, STEP 415 may be skipped. Please refer to the description of large young regions above for details about the behavior and structure of large young regions.

In STEP 420, the large young object is hosted by the large regions, and added to a large young object list (e.g. large young object list (135)) maintained by the garbage collector. The large young object list keeps track of the large young object as detailed above.

In STEP 421, it is determined if more large young objects require allocation. If it is determined that there are more large young objects that require allocation, then the process proceeds back to STEP 406. If it is determined that there are no more large young objects that require allocation, then the process may proceed to end.

In STEP 425, the scavenging process (i.e. garbage collection) begins. The scavenge process may be initiated by the garbage collector to perform garbage collection of the young generation (e.g. young generation (120)) of the memory heap (e.g. memory heap (115)). Those skilled in the art will appreciate that there may be other scenarios than those described above that precede STEP 425. Specifically, the garbage collector may decide that a full garbage collection is necessary (i.e. a garbage collection of all the generations of the heap), or the heap may be extended with additional memory.

In STEP 430, it is determined whether or not an object is a large young object. If the object is a large young object, then the process proceeds to STEP 435. If the object is not a large young object, then the process proceeds to STEP 440.

In STEP 435, it has been determined that the object is a large young object, and it is further determined if the visited bit of the large young object is set. At this point, the large young object is live (i.e. reachable from a root of garbage collection). If the visited bit of the large young object is set, then the process proceeds to STEP 445. If the visited bit of the large young object is not set, then the process proceeds to STEP 450. The visited bit of the large young object tracks whether the object has been visited in a garbage collection.

In STEP 440, the object (i.e. an object that is not a large young object) is scavenged. The object may be scavenged by the garbage collector. Scavenging of the object (e.g. a small young object) consists of allocating memory for the object in a to survivor space region (e.g. to survivor space (230)) in the young generation (e.g. young generation (210)), copying the content of the object to that new location, leaving a forwarding pointer in the header of the old location, and scavenging the references of the object. Those skilled in the art will appreciate that there may be other steps that are performed during the scavenge process that are not described.

In STEP 445, it is determined if there are any more objects to scavenge. If there are more objects to scavenge, then the process proceeds back to STEP 430. If there are no more objects to scavenge, then the process proceeds to STEP 475.

In STEP 450, the visited bit of the large young object is set. For example, the visited bit may be set to a representation of logical true (e.g. 1). Those skilled in the art will appreciate that there will be various ways to represent a set configuration in the visited bit. Setting the visited bit of the large young object signifies that the large young object has now been visited.

In STEP 455, the age of the large young object is incremented by 1. The age of the large young object may represent the number of garbage collection cycles the large young object has survived. Incrementing the age of the large young object by 1 signifies that the large young object has now traversed one more garbage collection cycle.

In STEP 460, it is determined if the age of the large young object is greater than a tenuring threshold. If the age is greater than the tenuring threshold, then the process proceeds to STEP 465. If the age is not greater than the tenuring threshold, then the process proceeds to STEP 470. The tenuring threshold is an age beyond which an object is promoted to an old object.

In STEP 465, the types of the large regions hosting the large young object are set from large young to large old (i.e. in the region table (105)). The setting of the types from young to old virtually promotes the large object from a large young object to a large old object without copying the large object. As a result of promoting the large object from a large young object to a large old object, on any subsequent garbage collector visits, the large object will be treated as a large old object. Specifically, in subsequent scavenges, the large old object will not be visited and its references will not be scavenged (except for references tracked by a remembered set).

In STEP 470, references of the large object (i.e. a large young object if proceeding directly from STEP 460, and a large old object if proceeding directly from STEP 465) are scavenged (i.e. garbage collection is performed). In this step, the locations within the object that holds references are identified and inspected to decide if the reference objects needs scavenging (i.e. garbage collection), and to update references to already scavenged objects. Therefore, it is determined if a reference is in the young generation and not in the to survivor space (e.g. to survivor space (230)). If this is true and the reference is a forwarding pointer, the reference is updated with the new reference of the object, otherwise, the referenced object is scavenged. Subsequently, the process proceeds to STEP 445 to determine if there are more objects to scavenge.

In STEP 475, the large regions hosting the large young objects with visited bits that are not set are released (i.e. the large young objects are dead as they were never marked visited or promoted). This may be performed by scanning (e.g. traversing) the large young object list (135) to identify the dead large young objects. This cleanup phase occurs after the young objects are completely scavenged. This must be done before clearing the visited bit otherwise the garbage collector will not be able to distinguish between garbage objects and live objects. The release of the large regions with unset visited bits frees them for use in future allocation of large objects.

In STEP 480, the visited bits of the large young objects are cleared. Those skilled in the art will appreciate that the set of large young objects at this point in the process includes all large young objects that were young before the start of the garbage collection process. At STEP 480, some of these large objects may no longer be young (since their age may have increased beyond the tenuring threshold) and they may have subsequently been promoted to large old objects (i.e. their type in the region table is the large old region type).

In STEP 485, the large young objects that have been promoted to large old objects are removed from the large young object list. After STEP 485, the process may proceed back to STEP 406 to determine if it is possible to allocate the new large young object whose allocation initiated the scavenge terminated at STEP 485. Therefore, the current iteration of the process will end. Those skilled in the art will appreciate that STEPS 475, 480 and 485 may be all performed during the same pass over the list of large young objects.

Figure 5:
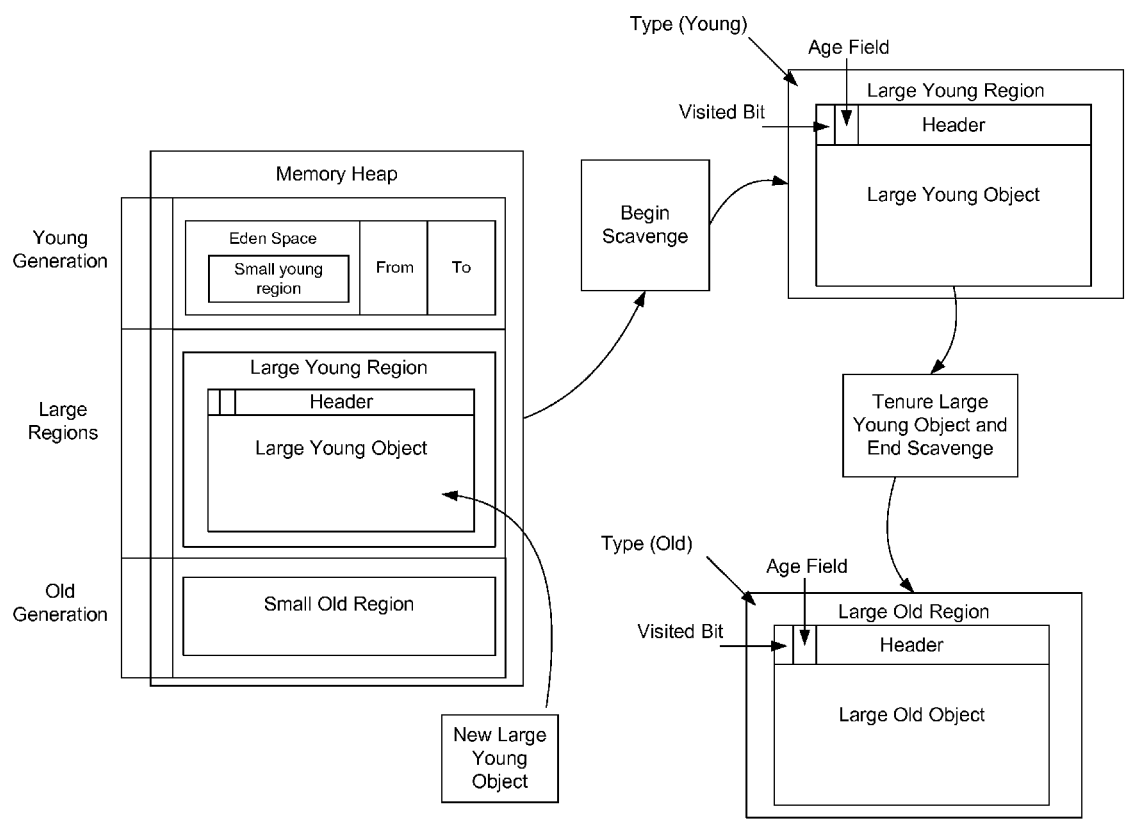
FIGS. 5 and 6 show examples in accordance with one or more embodiments of the invention.

FIG. 5 shows an example in accordance with one or more embodiments of the invention. The example shown in FIG. 5 may be used, for example, with the system (100), to tenure a large young object. Those skilled in the art will appreciate that the sequence of steps shown in FIG. 5 may differ among embodiments of the invention, and that one or more of the steps may be optional.

FIG. 5 shows a memory heap (e.g. memory heap (115)) containing a young generation (e.g. young generation (120)), an old generation (e.g. old generation (130)), and large regions (e.g. large regions (125)). A new large young object appears, and is hosted by at least one large young region (i.e. the large young object may be hosted by multiple large regions). After the allocation and hosting process of the large young object is completed, the scavenge process may begin. The garbage collection process may be performed on all large young objects (e.g. multiple garbage collections and scavenges may be performed) until the age field of the large young object reaches a tenuring threshold. Upon reaching the tenuring threshold, the large young object will be virtually promoted or tenured to become a large old object (i.e. a large promoted object). This occurs by changing the type of the large regions hosting the large object from young to old (i.e. in the region table (105)). Changing the type of the large regions hosting the large object avoids copying the large object to promote it, which may be beneficial in certain environments (e.g. a mobile device with limited memory capacity and low-memory bandwidth where copying is expensive).

This embodiment of the present invention provides for several advantages. As described, neither promoting nor scavenging requires copying of large objects. Further, large young objects that become garbage before they tenured are freed on garbage collection of the young generation. Additionally, this embodiment does not suffer the problems of garbage collectors that allocate large objects directly into the old generation (i.e. it does not pollute the old generation with objects that quickly become garbage, and does not inflate the remembered set when these objects hold many references (e.g. reference arrays)).

However, the issue of increasing the pressure on the young generation may still exist, which provides for more frequent garbage collection due to the decrease of space available for allocation, which in turn artificially accelerates young object tenuring. In one embodiment of the present invention, this may be solved by not accounting (or partially accounting) for the size of the large young objects on the total used young generation space. Instead, one may simply account an average object size, so that the frequency of garbage collection is not increased. Another alternative is detailed in FIG. 6.

Figure 6:
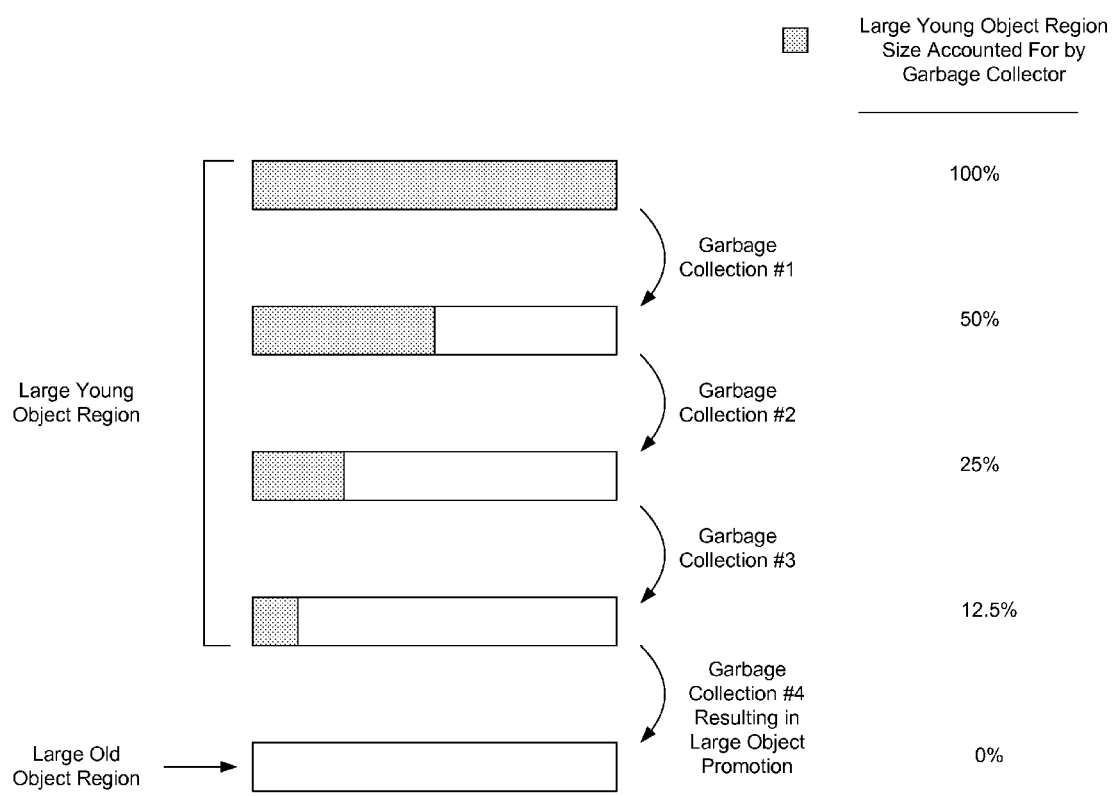

FIG. 6 shows an example in accordance with one or more embodiments of the invention. The example shown in FIG. 6 may be used, for example, with the system (100), to reduce acceleration of young object promotion. Those skilled in the art will appreciate that the example shown in FIG. 6 may differ among embodiments of the invention, and that one or more of the steps in the example may be optional.

FIG. 6 shows a mechanism for reducing acceleration of young object tenuring. In this embodiment, the accounted size of the large young object is decreased at every garbage collection until the large young object is promoted. For example, when a large young object is first allocated, its full size (i.e. 100%) is accounted for so as to take the spike in memory allocation rate into account. At a first garbage collection (e.g. garbage collection #1), only 50% the size of the large object is accounted for. At a second garbage collection (e.g. garbage collection #2), 25% of the size of the large object is accounted for. At a third garbage collection (e.g. garbage collection #3), 12.5% of the size of the large object is accounted for. This process may proceed in a similar fashion until the object is promoted. In FIG. 6, a fourth garbage collection (e.g. garbage collection #4) results in promotion of the large object from a large young object to a large old object. This process may cause large young objects to release the pressure they put on the young generation (e.g. young generation (120)) until they are promoted, avoiding the issue of accelerated tenuring while they reside in the young generation.

This accounting of size of young large objects can be implemented as follow. The young generation maintains a soft limit (e.g. of memory), typically in the eden space, tested against the current allocation hand (e.g. size) whenever an object is allocated in the eden. If the current allocation hand is greater than the soft limit, the eden space is considered full and a young generation garbage collection is initiated. The soft limit is initially set to the hard limit (i.e. the actual end of the eden space). When allocating a young large object, the soft limit is decreased by the amount of space allocated to the large object. When initiating a young generation collection, a counter of space used by live large objects is initialized to zero. Then, for every live large object visited during the young generation collection and not promoted to the old generation, the counter is increased by the size of the object right-shifted by the increased age of the large young object. When the young generation collection completes, the soft limit is reset to the hard limit decreased by the counter value. This approach can help to reduce the acceleration of small young object aging. In this scenario, garbage collection is triggered before the physical space of the young generation collection is used. A simpler, and preferred, alternative is to ignore the space used by large young object to trigger collection of the young generation. In other words, a young collection simply starts when both the eden space and the from space are full.

Figure 7:
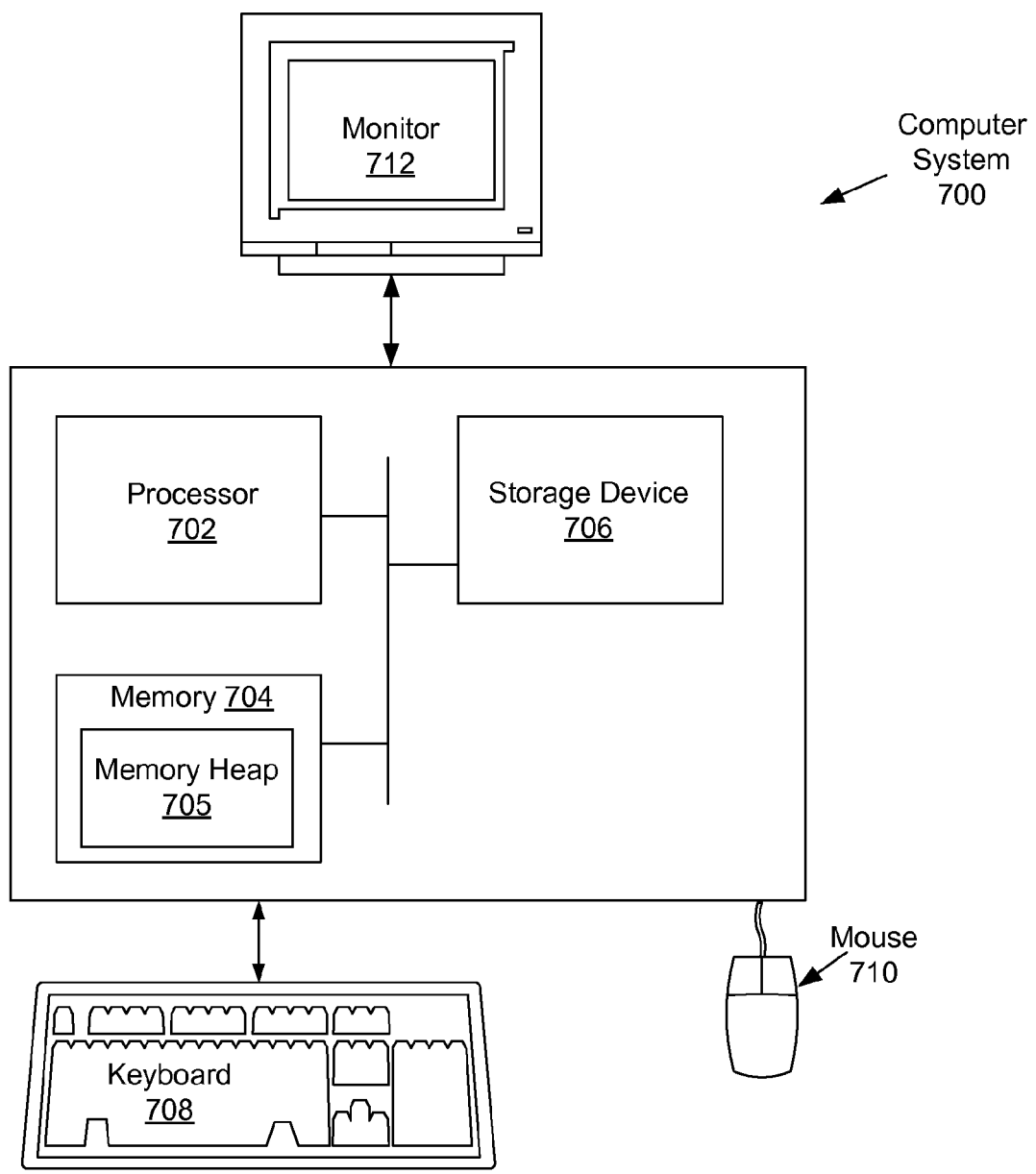
FIG. 7 shows a computer system in accordance with one or more embodiments of the invention.

The invention may be implemented on virtually any type of computer regardless of the platform being used. For example, as shown in FIG. 7, a computer system (700) includes a central processing unit (CPU) or processor (702), associated memory (704) containing a memory heap (705), a storage device (706), and numerous other elements and functionalities typical of today's computers (not shown). The computer system (700) may also include input means, such as a keyboard (708) and a mouse (710), and output means, such as a monitor (712). The computer system (700) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, the invention may be implemented on a distributed system having a plurality of nodes, where each portion of the invention (e.g. region table, remembered set, memory heap, old generation, large young object list, and the like) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing garbage collection promotion, comprising:
   receiving a request for allocation of an object;
   identifying the object as a large young object;
   allocating a plurality of large memory regions for the large young object in a garbage collector memory heap;
   setting to young a plurality of types of the plurality of large memory regions;
   hosting the large young object in the plurality of large memory regions;
   adding the large young object to a large young object list;
   initializing a counter comprising an age-adjusted size of the large young object to zero;
   incrementing the counter by a size of the large young object when the large young object is allocated;
   resetting the counter to zero when garbage collection of the young generation begins;
   increasing the counter by the size of the large young object right-shifted by an age of the large young object after the large young object is visited;
   determining, using the counter, that garbage collection is required prior to allocating a new object;
   determining that an age of the large young object is greater than a predetermined tenuring threshold, wherein the predetermined tenuring threshold specifies an age beyond which objects are promoted;
   setting the plurality of types of the plurality of large memory regions from young to old to promote the large young object to a large old object, wherein the plurality of large memory regions host the large young object;
   scavenging references of the large old object, wherein the large old object is a large promoted object;
   scanning the large young object list to identify a plurality of unvisited large young objects, wherein a plurality of visited bits of the plurality of unvisited large young objects are unset; and
   releasing a plurality of unvisited large memory regions, wherein the unvisited large memory regions host the plurality of unvisited large young objects.

2. The method of claim 1, further comprising:
   determining that the object in the garbage collector memory heap is the large young object, wherein the large young object is live;
   determining that a visited bit of the large young object is unset;
   setting the visited bit of the large young object; and
   incrementing the age of the large young object by one before determining that the age of the large young object is greater than the predetermined tenuring threshold.

3. The method of claim 1, further comprising:
   clearing the plurality of visited bits after releasing the plurality of unvisited large memory regions; and
   removing a plurality of promoted large young objects from the large young object list.

4. A system for performing garbage collection promotion, comprising:
   a processor;
   a memory operatively connected to the processor; and
   a garbage collector memory heap comprising:
      a young generation;
      an old generation; and
      a plurality of large memory regions configured to:
         receive a request for allocation of an object;
         identify the object as a large young object;
         allocate for the large young object in a garbage collector memory heap;
         set to young a plurality of types of the plurality of large memory regions;
         host the large young object;
         add the large young object to a large young object list;
         initialize a counter comprising an age-adjusted size of the large young object to zero;
         increment the counter by a size of the large young object when the large young object is allocated;
         reset the counter to zero when garbage collection of the young generation begins;
         increase the counter by the size of the large young object right-shifted by an age of the large young object after the large young object is visited; and
         determine, using the counter, that garbage collection is required prior to allocating a new object;
         determine that an age of the large young object is greater than a predetermined tenuring threshold, wherein the predetermined tenuring threshold specifies an age beyond which objects are promoted;

set the plurality of types of the plurality of large memory regions from young to old to promote the large young object to a large old object, wherein the plurality of large memory regions host the large young object;

scavenge references of the large old object, wherein the large old object is a large promoted object;

scan the large young object list to identify a plurality of unvisited large young objects, wherein a plurality of visited bits of the plurality of unvisited large young objects are unset; and release a plurality of unvisited large memory regions, wherein the unvisited large memory regions host the plurality of unvisited large young objects.

5. The system of claim 4, wherein the plurality of large memory regions are further configured to:

determine that the object in the garbage collector memory heap is the large young object, wherein the large young object is live;

determine that a visited bit of the large young object is unset;

set the visited bit of the large young object; and increment the age of the large young object by one before determining that the age of the large young object is greater than the predetermined tenuring threshold.

6. The system of claim 4, wherein the plurality of large memory regions are further configured to:

clear the plurality of visited bits after releasing the plurality of unvisited large memory regions; and remove a plurality of promoted large young objects from the large young object list.

7. A computer readable medium storing instructions to perform garbage collection promotion, the instructions executable on a processor and comprising functionality to:

receive a request for allocation of an object;

identify the object as a large young object;

allocate a plurality of large memory regions for the large young object in a garbage collector memory heap;

set to young a plurality of types of the plurality of large memory regions;

host the large young object in the plurality of large memory regions;

add the large young object to a large young object list;

initialize a counter comprising an age-adjusted size of the large young object to zero;

increment the counter by a size of the large young object when the large young object is allocated;

reset the counter to zero when garbage collection of the young generation begins;

increase the counter by the size of the large young object right-shifted by an age of the large young object after the large young object is visited;

determine, using the counter, that garbage collection is required prior to allocating a new object;

determine that an age of the large young object is greater than a predetermined tenuring threshold, wherein the predetermined tenuring threshold specifies an age beyond which objects are promoted;

set the plurality of types of the plurality of large memory regions from young to old to promote the large young object to a large old object, wherein the plurality of large memory regions host the large young object;

scavenge references of the large old object, wherein the large old object is a large promoted object;

scan the large young object list to identify a plurality of unvisited large young objects, wherein a plurality of visited bits of the plurality of unvisited large young objects are unset; and release a plurality of unvisited large memory regions, wherein the unvisited large memory regions host the plurality of unvisited large young objects.

8. The computer readable medium of claim 7, the instructions further comprising functionality to:

determine that the object in the garbage collector memory heap is the large young object, wherein the large young object is live;

determine that a visited bit of the large young object is unset;

set the visited bit of the large young object; and increment the age of the large young object by one before determining that the age of the large young object is greater than the predetermined tenuring threshold.

9. The computer readable medium of claim 7, the instructions further comprising functionality to:

clear the plurality of visited bits after releasing the plurality of unvisited large memory regions; and remove a plurality of promoted large young objects from the large young object list.

* * * * *